(12) United States Patent
Bonne et al.

(10) Patent No.: US 11,625,353 B1
(45) Date of Patent: Apr. 11, 2023

(54) PRIORITIZED PARALLEL TO SERIAL INTERFACE

(71) Applicant: Amazon Technologies, Inc., Seattle, WA (US)

(72) Inventors: Itamar Bonne, Maccabim (IL); Simaan Bahouth, Shefar'am (IL); Ofer Naaman, Hod Hasharon (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/444,351

(22) Filed: Aug. 3, 2021

(51) Int. Cl.
   *G06F 13/40* (2006.01)
   *G06F 9/445* (2018.01)
   *G06F 13/42* (2006.01)

(52) U.S. Cl.
   CPC ...... *G06F 13/4068* (2013.01); *G06F 9/44505* (2013.01); *G06F 13/4208* (2013.01); *G06F 13/4282* (2013.01)

(58) Field of Classification Search
   CPC ................................................ H04W 72/0446
   See application file for complete search history.

*Primary Examiner* — Henry Tsai
*Assistant Examiner* — Juanito C Borromeo
(74) *Attorney, Agent, or Firm* — Weaver Austin Villeneuve & Sampson LLP

(57) ABSTRACT

Techniques to prioritize serially transmitted data are described. The sequence of serial data segments being transmitted across a communication interface is modified such that prioritized segments that may require a higher refresh rate are transmitted more frequently than regular data segments. A prioritization configuration register can be implemented in both the transmitter and the receiver such that both sides are programmed with the altered sequence of transmission. The prioritization configuration stored in the prioritization configuration register can indicate the points in the sequence where the out-of-order transmission occurs, and which data segments are transmitted in them. The transmitter can use this information to serialize the data segments according to the prioritization, and the receiver can re-parallelize the received data as indicated by the altered sequence.

21 Claims, 9 Drawing Sheets

PRIORITIZED PARALLEL TO SERIAL INTERFACE

BACKGROUND

Integrated circuit devices are becoming more complex to meet the ever-increasing performance demands. As more functions are integrated into a single chip, the amount of data and information being processed and transferred between components have also increased. For example, a data processor can process and generate data for various parallel data channels. To communication the large amount of data across a communication interface that may have a limited number of interface signals, the parallel data channels can be serialized at the transmitter, and then deserialized at the receiver.

BRIEF DESCRIPTION OF THE DRAWINGS

Various embodiments in accordance with the present disclosure will be described with reference to the drawings, in which.

DETAILED DESCRIPTION

To transfer data between components of a computing system via a communication interface, a full parallel bus carrying multiple data channels/signals can be serialized into a narrower data bus. In some implementations, serializing the data bus can reduce the number of signals on the communication interface to improve routability of the data bus. However, serialization causes each data channel or segment of the full data bus to be transmitted periodically, and thus a delay is injected between sequential data of the same channel/segment being transmitted across the communication interface. To reduce the delay and latency of receiving sequential data of the same data channel/segment, the bus frequency of the communication interface can be increased. However, it may not be feasible to increase the bus frequency beyond a certain threshold. Some types of data (e.g., synchronization data) may need to be timely received at the receiver according to a certain refresh rate. If the bus frequency is insufficient to satisfy the refresh rate upon serialization, the communication interface may be inadequate for transferring such types of data.

The techniques disclosed herein allow serialized data to be prioritized such that data that may need to be timely received can still meet the data's refresh rate requirement despite being transmitted across a serialized interface. The sequence of the serially transmitted data segments is modified such that prioritized segments that may require a higher refresh rate are transmitted more frequently than regular data segments. A prioritization configuration register can be implemented in both the transmitter and the receiver such that both sides can be programmed with the altered sequence of transmission. The prioritization configuration stored in the prioritization configuration register can indicate the points in the sequence where the out-of-order transmission occurs, and which data segments are transmitted in them. The transmitter can use this information to serialize the data segments according to the prioritization, and the receiver can re-parallelize the received data as indicated by the altered sequence.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
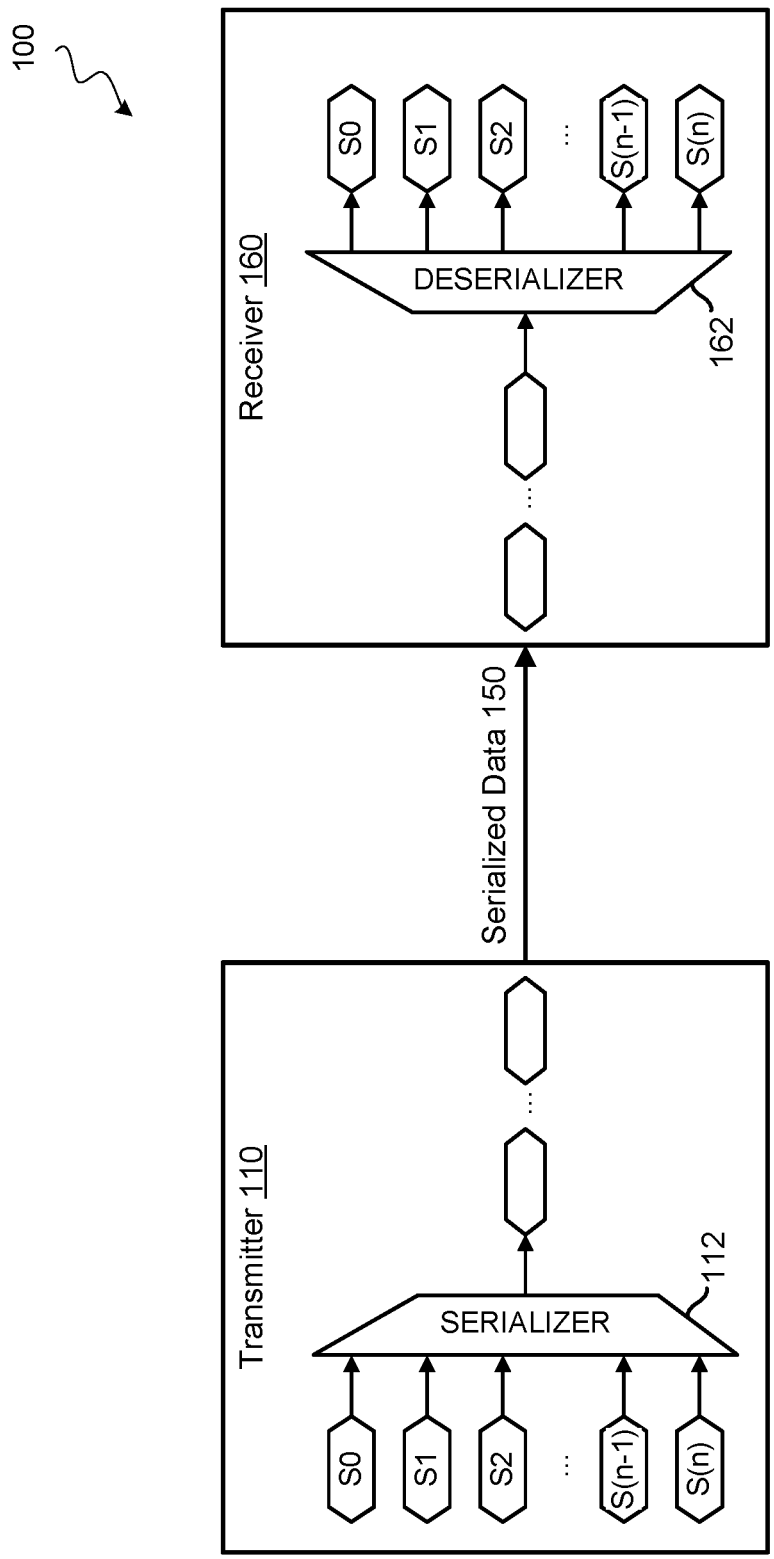
FIG. 1 illustrates an example of a computing system.

FIG. 1 illustrates an example of a computing system 100 in which a transmitter 110 transfers data to a receiver 160. Transmitter 110 includes a serializer circuit 112, and can be a transmitter circuit that is integrated as part of a larger integrated circuit device such as a processor, accelerator (e.g., graphics processing unit, tensor processing unit, neural network accelerator, etc.), controller (e.g., network interface controller, memory controller, interrupt controller, etc.), memory, peripheral device (e.g., sensor, input/output device, etc.), or other types of integrated circuit device that provides data and/or information to other devices. In some implementations, transmitter 110 can be a transmitter integrated circuit device that receives parallel data segments, or can be part of an integrated circuit device that processes and generates one or more parallel data segments.

In the example shown, transmitter 110 serializes parallel data segments S0 to S(n) into a serialized data bus 150 for transmission to receiver 160. Transmitter 110 may receive one or more of the parallel data segments from various sources, generate one or more of the parallel data segments, or a combination of both. Each of the parallel data segments can be implemented as one or more data signals. For example, each of the data segments can be a 1-bit data bus, a 2-bit data bus, an 8-bit data bus, or a 16-bit data bus, etc. Furthermore, one or more of the data segments can be implemented using a different number of data signals than other data segments.

Serializer circuit 112 can perform time-division multiplexing to serialize parallel data segments S0 to S(n) into serialized data bus 150. Although data bus 150 is referred to as "serialized," serialized data bus 150 can be implemented using one or more data signals. For example, serialized data bus 150 can be a 1-bit data bus, a 2-bit data bus, an 8-bit data bus, or a 16-bit data bus, etc. In some implementations, the number of data signals implemented in serialize data bus 150 can be the same as the number of data signals as one of the data segments (e.g., the widest bus of the data segments if the data segments have different bus widths).

In a default configuration, serializer circuit 112 serializes parallel data segments S0 to S(n) in a default sequence. For example, serializer circuit 112 may transmit data segment S0 on serialized data 150 during a first timeslot, transmit data segment S1 in the next timeslot, and so on. Upon transmitting data segment S(n) onto serialized data bus 150, serializer circuit 112 then transmits the next sequential data of data segment S0 in the next timeslot. As such, transmitter 110 may transmit parallel data segments S0 to S(n) in a round robin fashion in the default configuration. In implementations in which some data segments may have different bus widths, one or more data signal in serialized data bus 150 can be idle during transmission of those data segments.

Data segments S0 to S(n) may carry different types of data, data from different sources, or a combination of both. For example, the data segments can be used to transmit interrupt data from different interrupt sources. In some implementations, the data segments can be used to transfer data for different user applications, etc. Some of the data segments can also be used to transmit debug data. In some implementations, some of the data segments can be used to transmit time-sensitive data/information such as timing synchronization data/signals, memory refresh data/requests for dynamic random-access memory, etc.

Receiver 160 includes a de-serializer circuit 162, and can be a receiver circuit that is integrated as part of a larger integrated circuit device such as a processor, accelerator (e.g., graphics processing unit, tensor processing unit, neural network accelerator, etc.), controller (e.g., network interface controller, memory controller, interrupt controller, etc.), memory, peripheral device (e.g., sensor, input/output device, etc.), or other types of integrated circuit device that receives data and/or information from other devices. In some implementations, receiver 160 can be a receiver integrated circuit device that provides de-serialized data segments to other devices for processing, or can be part of an integrated circuit device that processes one or more of the de-serialized data segments.

De-serializer circuit 162 can perform time-division demultiplexing to re-parallelize the data sequence received on serialized data bus 150 into parallel data segments S0 to S(n). For example, de-serializer 162 may receive data corresponding to data segment S0 during a first timeslot on serialized data bus 150, and provide that data onto the S0 data bus; de-serializer 162 may receive data corresponding to data segment S1 during the next timeslot on serialized data bus 150, and provide that data onto the S1 data bus, and so on. Each of the data segments S0 to S(n) generated by de-serializer 162 can have the same number of data signals corresponding to the data segments S0 to S(n) on the transmitter 110 side. After de-serializing the data bus 150, each of the parallel data segments S0 to S(n) is provided to one or more destinations for processing. A destination can be a component in receiver 160, or a component external to receiver 160, and one or more destinations may receive multiple data segments to process.

In some implementations, because serialized data bus 150 has fewer number of data signals than the totality of the number of data signals of the parallel data segments S0 to S(n), serialized data bus 150 can be clocked at a faster frequency than the parallel data segments. However, even with a faster clock frequency, a delay is still injected between sequential sections of the same data segment, because intervening data for the other data segments are transmitted during this delay. For example, after transmitting a first data section of data segment S0 on serialized data bus 150, the next data section of data segment S0 will not be transmitted until the data for data segments S1 to S(n) have been transmitted. While this may be acceptable for certain types of data such as interrupts and debug data, the intervening delay can be unacceptable for other types of data. For example, when the receiver is operating from a different clock source or at a different clock frequency, certain timing synchronization data may be needed periodically to avoid the receiver from drifting out of synch with the transmitter. As another example, some synchronization data (e.g., used for handshaking communication protocols) may need to be received within a certain time period to avoid timeouts. As a further example, a DRAM refresh requests may need to be received according to a temperature-dependent refresh rate to avoid memory malfunction. In implementations in which a system includes multiple transmitters communicating with multiple receivers, certain signals may also need to be received within a bounded drift of each other such that the skew of the signals are within a certain threshold.

Figure 2:
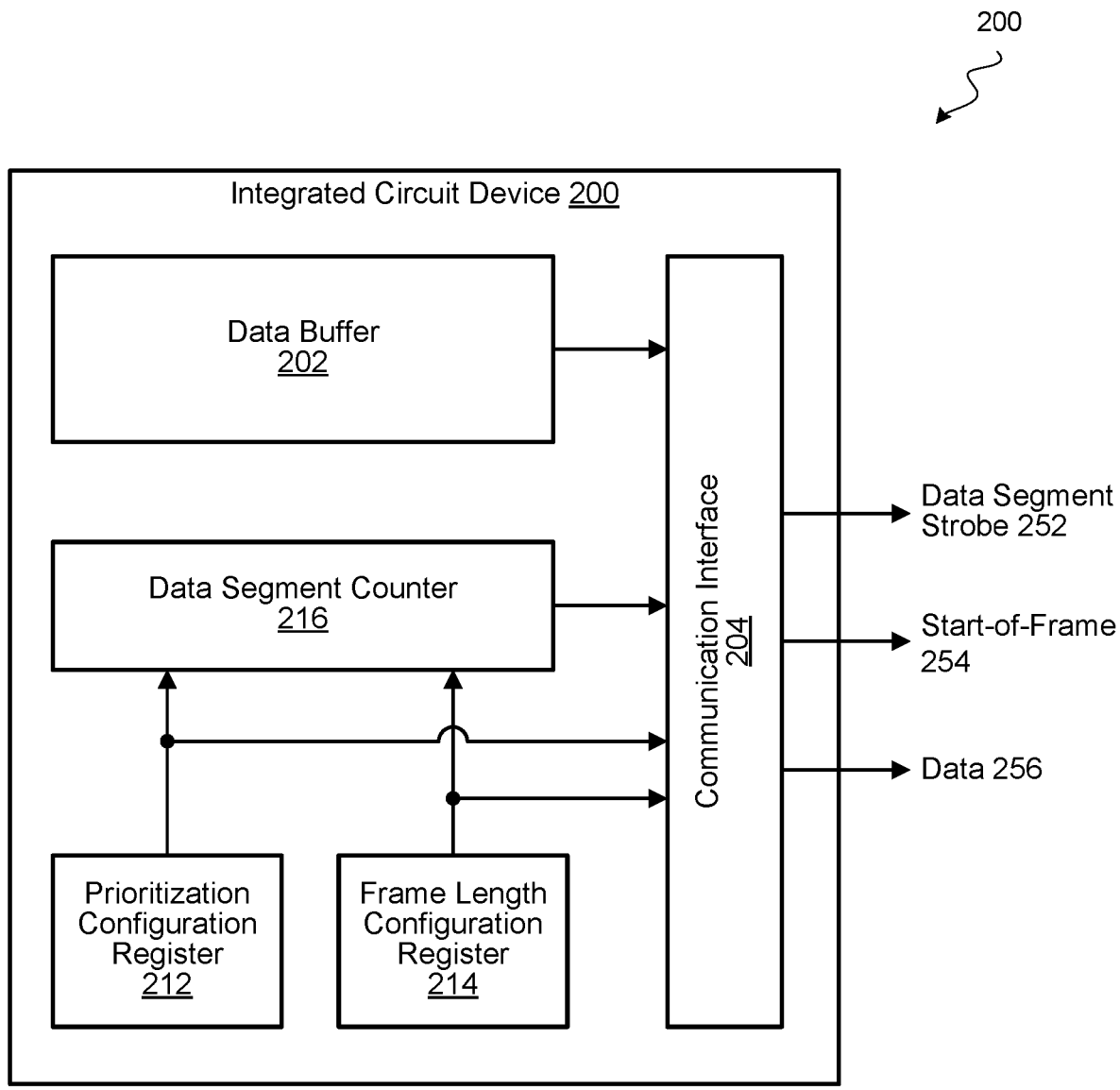
FIG. 2 illustrates an example of an integrated circuit device.

To accommodate certain types of data that may be time-sensitive, the serialization of the parallel data segments (and similarly the de-serialization of the serialized data) can be performed according to a prioritized sequence in which certain data segments are transmitted more frequently than the other segments. FIG. 2 illustrates a block diagram of an integrated circuit device 200 that has a programmable communication interface to perform prioritized serial communication. The components of integrated circuit device 200 can be used to implement a transmitter such as transmitter 110.

Integrated circuit device 200 includes a data buffer 202 and a communication interface 204. Data buffer 202 can be used to temporary store data from one or more data sources in preparation for transmission via communication interface 204. For example, data buffer 202 can be used to temporarily store parallel data segments before they are serialized by communication interface 204. Communication interface 204 is operable to transfer data in data segments assigned timeslots of a data frame. Communication interface 204 may include a serializer such as serializer 112 of transmitter 110 to generate a data bus 256 (e.g., serialized data bus 150).

In addition to serializing parallel data segments assigned to timeslots on data bus 256, communication interface 204 also generates a data segment strobe signal 252 and a start-of-frame signal 254. Data segment strobe signal 252 can be configured to transition at the start of each data segment of data bus 256. For example, the rising edge (or falling edge) of data segment strobe signal 252 can be synchronized with the start of each data segment. Data segment strobe signal 252 can also be used to indicate timeslot transitions, because each data segment is transmitted on an assigned timeslot.

As mentioned above, the data segments are assigned to timeslots of a data frame for transmission on data bus 256. In other works, each data frame includes a sequence of data segments. The sequence of data segments is repeated in each data frame. Start-of-frame signal 254 can be configured to transition at the start of each data frame of data bus 256. For example, the rising edge (or falling edge) of start-of-frame signal 252 can be synchronized with the start of each data frame.

To program integrated circuit device 200 with a prioritized sequence of data segments for serialization, integrated circuit device 200 includes a prioritization configuration register 212, a frame length configuration register 214, and a data segment counter 216. Frame length configuration register 214 is configured to store a programmable frame length value representing a based number of data segments in the data frame. The frame length value can be, for example, the number of different data segments or data channels being serialized. The frame length value also indicates the number of initial timeslots in a data frame.

Prioritization configuration register 212 is configured to store a prioritization configuration that provides a data segment identifier identifying a prioritized data segment and one or more timeslot identifiers associated with the prioritized data segment. The prioritization configuration configures the communication interface to insert additional timeslots in the data frame corresponding to the timeslot identifiers in the prioritization configuration to transmit the prioritized data segment. By programming prioritization configuration register 212, a data segment such as a time-sensitive data segment can be prioritized, and be transmitted more frequently than other data segments. In some implementations, the prioritization configuration can include more than one data segment to prioritize, and addition timeslots can be inserted into the data frame for the other prioritized data segments.

Data segment counter 216 is configured to count data segments in the data frame. In some implementations, data segment counter 216 is configured to increment for each timeslot of the data frame except for the additional timeslot(s) inserted for the prioritization configuration. Data segment counter 216 rollovers at a counter value corresponding to the frame length value programmed in frame length configuration register 214. Thus, rollover of data segment counter 216 may indicate the start of a new frame.

The combination of the frame length value, prioritization configuration, and data segment count value can be used by communication interface 204 to insert additional timeslot(s) to transmit any prioritized data segment on data bus 256, and to adjust the timing of the start-of-frame signal 254 to account for the additional timeslots inserted into the data frame. In some implementations, integrated circuit device 200 may also include a phase offset register configured to store a phase offset value representing a programmable delay between the start-of-frame signal 254 and the data segments transmitted on data bus 256. The programmable delay can be used to adjust and correct for skews or phase alignment between the start-of-frame signal 254 and the data segments transmitted on data bus 256. In some implementations, the programmable delay is inserted in the data signal(s) implementing data bus 256, which will also adjust the skew between data bus 256 and data segment strobe 252.

Although the components of integrated circuit device 200 have been described for implementing a transmitter, similar components can be implemented in an integrated circuit device that is used as a receiver device. For example, a receiver may similarly include a frame length configuration register, a prioritization configuration register, and a data fragment counter. Instead of implementing a serializer in the communication interface, a receiver may implement a de-serializer such as de-serializer 162. The communication interface of the receiver may receive a data segment strobe signal, a start-of-frame signal, and serialized data on a data bus. The start-of-frame signal can be used by the receiver to indicate the first timeslot of a data frame, and the data segment counter can be incremented using the data segment strobe signal to count the data segments/timeslots, except for the additional timeslots inserted based on the prioritization configuration. Using the prioritize configuration, the receiver can determine which timeslot corresponds to which data segment such the serialized data can be re-parallelized to the proper data channel.

The transmitter and the receiver can be independently programmed with the same prioritization configuration and frame length value such that the receiver expects the sequence of data segments being sent by the transmitter. In some implementations, the transmitter may send its configuration to the receiver during a configuration transmission phase. This can eliminate the need to program the two sides separately, while also ensuring the configuration is synchronized between the transmitter and the receiver. The configuration transmission phase can be executed once at the beginning of operation, or periodically to allow the sequence of data segments to change over time. In implementations that provide a periodic configuration transmission phase, the configuration transmission phase can be executed at long intervals to limit the impact on the interface bandwidth.

Figure 3:
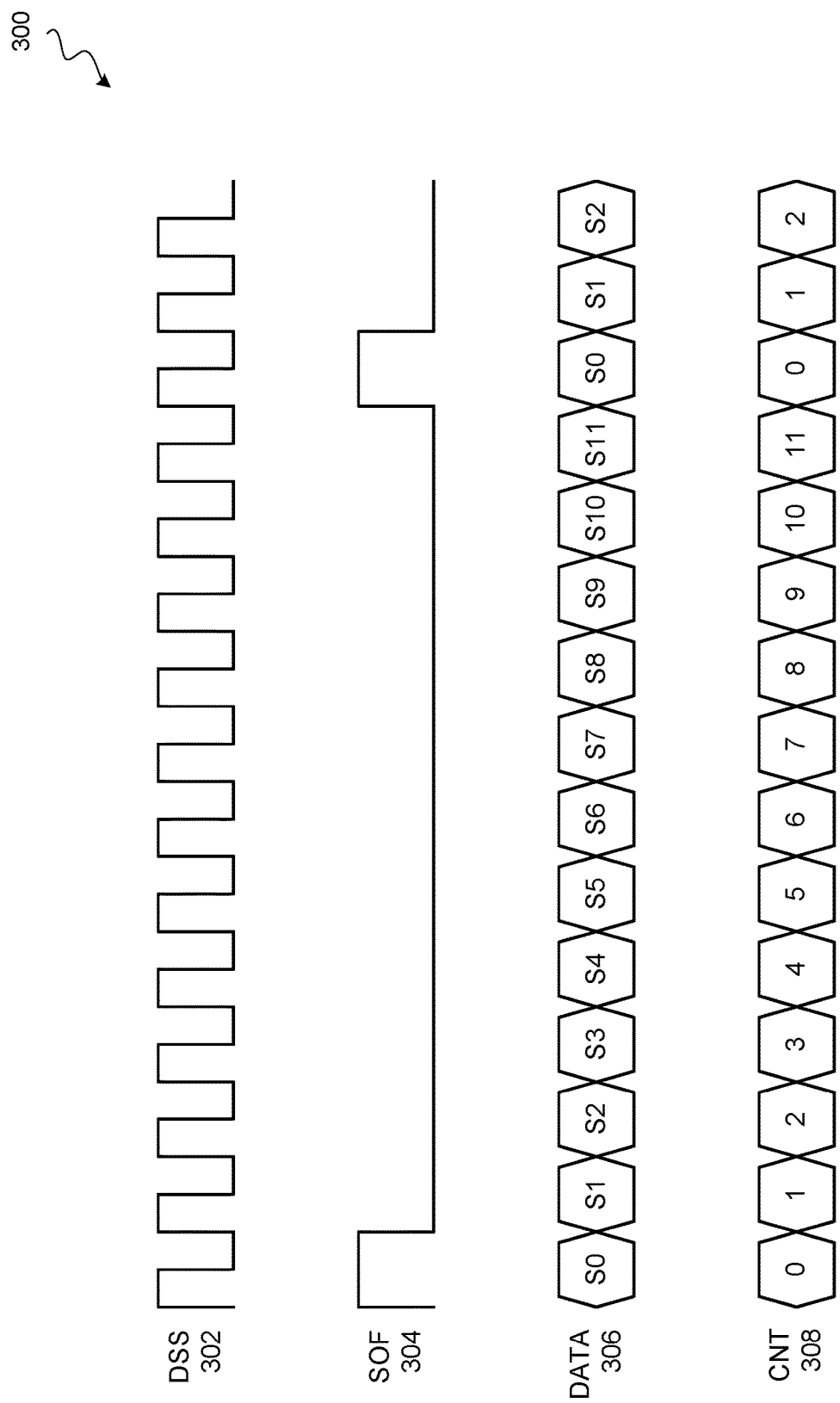
FIG. 3 illustrates a waveform of an example of data transmission.

FIG. 3 illustrates a signal waveform 300 showing an example of data transmission using a serialized communication interface. Waveform 300 includes a data segment strobe (DSS) signal 302, a start-of-frame (SOF) signal 304, and a serialized data bus 306 that are transmitted from a transmitter to a receiver. Waveform 300 also shows a counter value CNT 308 of a data segment counter internal to the transmitter/receiver to illustrate the operation of the data segment counter.

The data transmission shown in waveform 300 does not have any prioritized data segments and thus can be a default configuration of the communication interface. The data frame in waveform 300 has a frame length of twelve data segments. As such, a data frame has twelve timeslots to transmit data segments S0 to S11. Data segments S0 to S11 are sequentially serialized onto data bus 306, and the sequence is repeated in each frame. The first timeslot is assigned to data segment S0, the second timeslot is assigned to data segment S1, and so on, and each timeslot has the same duration. In this default configuration, counter value CNT 308 reflects the timeslot number. Since the data segments S0 to S11 are transmitted in sequence, the data segment identifier number coincides with the timeslot number.

As shown in FIG. 3, data segment counter rollovers when the counter value CNT 308 reaches a value representing the frame length, and the rollover of the data segment counter coincides with assertion of start-of-frame signal 304. In some implementations, the start-of-frame signal 304 remains asserted for the duration of the first data segment S0 of the transmission sequence, and then is deasserted until the next data frame. In other implementations, the start-of-frame signal 304 can be asserted for a different duration. In some implementations, there can be an idle time between the data frames when no data is being transmitted. In such implementations, the start-of-frame signal can be asserted at the start of the data frame and remain asserted for the duration of the data frame. Data segment strobe 302 is asserted and deasserted once for each data segment. Although data segment strobe 302 is shown to have a 50-50 duty cycle in waveform 300, data segment strobe 302 can be asserted for a different duration in other implementations. It should also be noted that although data segment strobe 302 resembles a clock signal, the clock frequency of the actual system clock used by the transmitter/receiver can be may times faster than data strobe signal 302.

As mentioned above, the data transmission shown in waveform 300 does not include any prioritized data segment. As such, each data segment is transmitted once within a data frame, and a delay is inserted between sequential transmission of data for the same data segment. For example, suppose each timeslot has a duration of time T. At the start of the first data frame, data segment S0 is transmitted on data bus 306 during the first timeslot. Thereafter, the data for data segment S0 is not transmitted on data bus 306 for a time duration of 11T until the next data frame. If data segment S0 is conveying time-sensitive data having a refresh rate of 4T (e.g., data segment S0 is supposed to be received at least once every time period of 4T), this configuration of the communication interface may cause erroneous operation.

Figure 4:
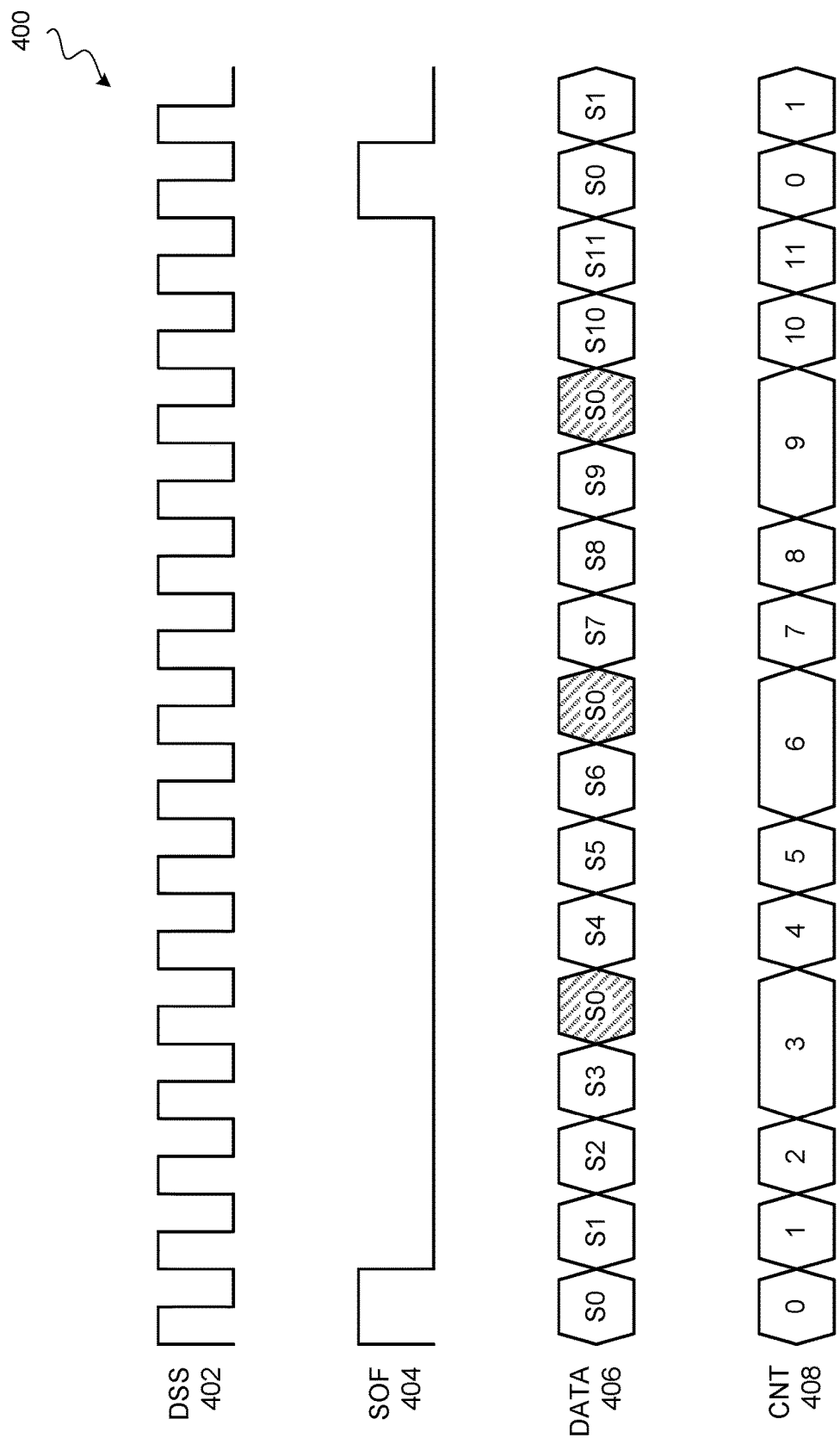
FIG. 4 illustrates a waveform of another example of data transmission.

FIG. 4 illustrates a signal waveform 400 showing another example of data transmission using a serialized communication interface. The data transmission in waveform 400 prioritizes data segment S0 such that data segment S0 can meet the refresh rate of 4T. Waveform 400 includes a data segment strobe (DSS) signal 402, a start-of-frame (SOF) signal 404, and a serialized data bus 406 that are transmitted from a transmitter to a receiver. Waveform 400 also shows a counter value CNT 408 of a data segment counter internal to the transmitter/receiver to illustrate the operation of the data segment counter.

The data frame in waveform 400 has a frame length of twelve data segments, which is the same as FIG. 3. As such, the frame length configuration is the same in waveform 400 as in waveform 300. However, in contrast to waveform 300, the prioritization configuration in waveform 400 is programmed to prioritize data segment S0 at timeslots 3, 6, and 9. Based on this prioritization configuration, the communication interface inserts an additional timeslot for each of timeslots 3, 6, and 9 to transmit data for data segment S0. The additional timeslots inserted into serial data bus 406 are shaded to highlight the positions of the inserted timeslot relative to the data frame. As shown in FIG. 4, programming the prioritization configuration with three additional timeslot positions extends the data frame by three timeslots to transmit the prioritized data segment even though the frame length configuration has not changed.

To insert the additional timeslots, the communication interface initially serializes the data segments according to the default timeslot assignments until a timeslot that is programmed in the prioritization configuration is reached. For example, referring to FIG. 4, the communication interface transmits data segment S0 during timeslot 0, data segment S1 during timeslot 1, and data segment S2 during timeslot 2 until timeslot 3 is reached. Since timeslot 3 is a timeslot programmed in the prioritization configuration, the communication interface transmits the original assigned data segment S3 for this timeslot, and then inserts an additional timeslot to transmit the prioritized data segment indicated in the prioritization configuration, which is data segment 0 in this example. Alternatively, the communication interface can transmit the additional timeslot for the prioritized data segment 0 before the original assigned data segment 3.

The communication interface then continues to transmit data segment S4 during timeslot 4 and so on, until timeslot 6 is reached. Since timeslot 6 is a timeslot programmed in the prioritization configuration, the communication interface transmits the original assigned data segment S6 for this timeslot, and then inserts an additional timeslot to transmit the prioritized data segment indicated in the prioritization configuration, which is data segment 0 in this example. Similarly, the communication interface continues to transmit data segment S7 during timeslot 7 and so on, until timeslot 9 is reached. Since timeslot 9 is a timeslot programmed in the prioritization configuration, the communication interface transmits the original assigned data segment S9 for this timeslot, and then inserts an additional timeslot to transmit the prioritized data segment indicated in the prioritization configuration, which is data segment 0 in this example. The communication interface then continues to transmit data segment S10 during timeslot 10 and data segment S11 during timeslot 11, which completes the data frame. The same sequence is then repeated for the next data frame. By way of comparison, the prioritization configuration in the example of waveform 400 allows data segment S0 to be transmitted at least once every time period of 4T such that data segment S0 can satisfy its refresh rate, whereas without the prioritization configuration, the data segment S0 is transmitted once evert tie period of 12T.

To assist the communication interface to track the timeslots and data segments of the data frame, the data segment counter is configured to increment for each timeslot of the data frame except for the additional timeslots inserted for the prioritize configuration. Referring to FIG. 4, counter value 408 increments for each timeslot/data segment until the additional timeslot at timeslot 3 is inserted for prioritized data segment S0. At this point, counter value 408 remains at a counter value of 3 and is not incremented until the next new timeslot 4 in which data segment S4 is transmitted. By operating the data segment counter in such a manner, the counter value can be used by the communication interface to retrieve data from the proper data segment or data channel during the normal non-inserted timeslots. The prioritization configuration can be referenced to determine the points in the data frame in which additional timeslots are inserted and the data segment to transmit in the additional timeslots. A similar data segment counter that is incremented according to the prioritization configuration can be implemented in the receiver. The counter value in combination with the prioritization configuration allows the receiver to track the proper target for each data segment being received over the interface.

Figure 5:
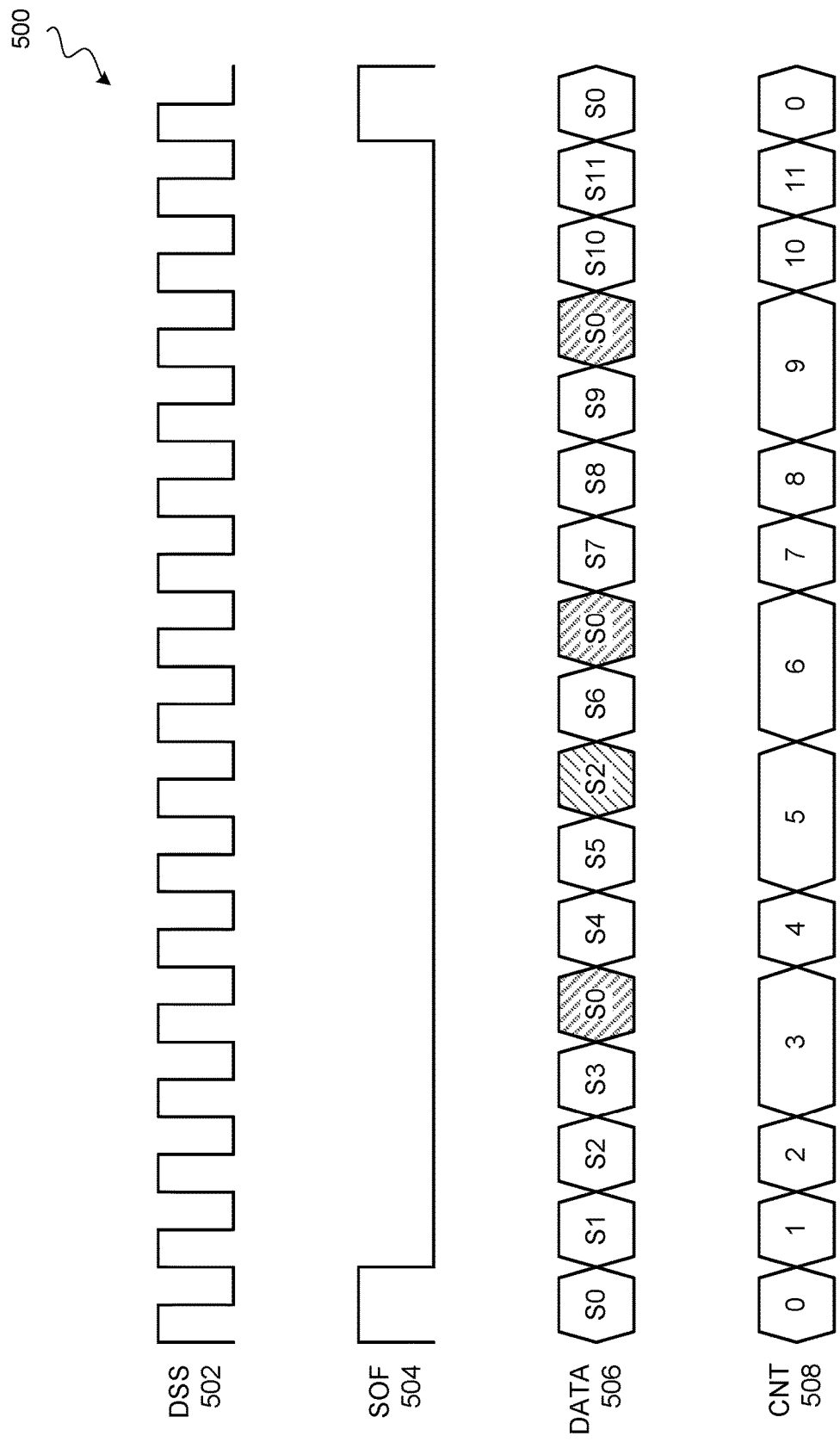
FIG. 5 illustrates a waveform of a further example of data transmission.

FIG. 5 illustrates a signal waveform 500 showing a further example of data transmission using a serialized communication interface. The data transmission in waveform 500 prioritizes data segment S0 as well as data segment S2. Waveform 500 includes a data segment strobe (DSS) signal 502, a start-of-frame (SOF) signal 504, and a serialized data bus 506 that are transmitted from a transmitter to a receiver. Waveform 500 also shows a counter value CNT 508 of a data segment counter internal to the transmitter/receiver to illustrate the operation of the data segment counter.

Similar to waveforms 300 and 400, the data frame in waveform 500 has a frame length of twelve data segments. As such, the frame length configuration is the same in waveform 500 as in waveforms 300 and 400. The prioritization configuration in waveform 500 is programmed to prioritize data segment S0 at timeslots 3, 6, and 9, and also to prioritize data segment S2 at timeslot 5. Based on this prioritization configuration, the communication interface inserts an additional timeslot for each of timeslots 3, 6, and 9 to transmit data for data segment S0. The communication interface also inserts an additional timeslot for timeslot 5 to transmit data for data segment S2. The addition timeslots inserted into serial data bus 506 are shaded to highlight the positions of the inserted timeslot relative to the data frame. As shown in FIG. 5, programming the prioritization configuration with four additional timeslot positions (three for data segment S0, and one for data segment S2) extends the data frame by four timeslots to transmit the prioritized data segments even though the frame length configuration has not changed. The data segment counter operates in a similar manner as described above (increments for each timeslot except for any of the inserted timeslots). As such, a detailed description of which need not be repeated.

Figure 6:
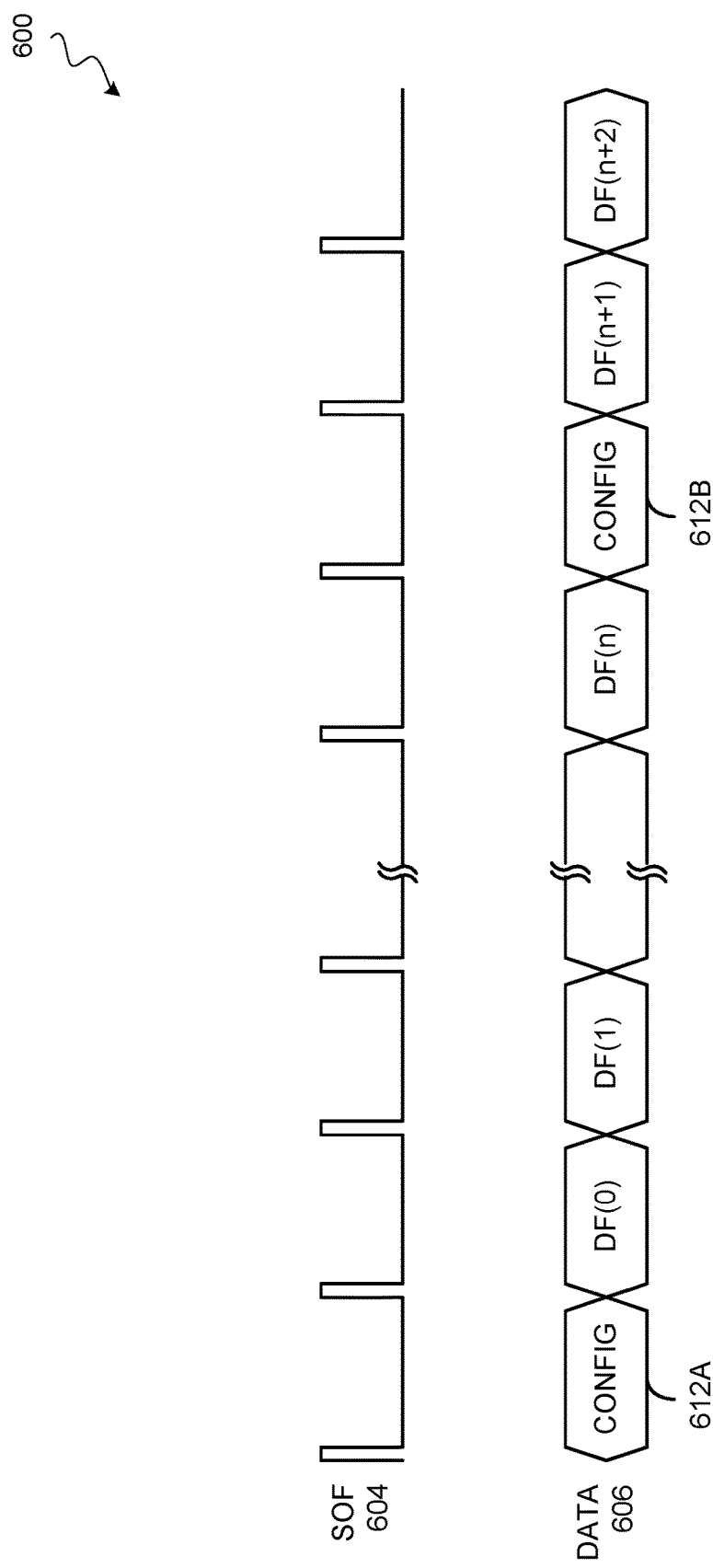
FIG. 6 illustrates a waveform of another example of a configuration transmission phase.

FIG. 6 illustrates a signal waveform 600 showing an example of a configuration transmission phase. Waveform 600 includes a start-of-frame (SOF) signal 604 and a serialized data bus 606 that are transmitted from a transmitter to a receiver. The data segment strobe signal has been omitted for ease of explanation.

As shown in FIG. 6, a configuration transmission phase 612A at the beginning of operation can be used to transmit the communication interface configuration from the transmitter to the receiver. The configuration being transmitted can include the prioritization configuration as well as a frame length value. Once configured, data frames DF can be transferred from the transmitter to the receiver according to the communication interface configuration. In some implementations, the configuration transmission phase can occur periodically. For example, the configuration transmission phase can occur once after every (n+1) data frames are sent. Accordingly, as shown in FIG. 6, a second configuration transmission phase 612B occurs after data frame DF(n). Having a periodic configuration transmission phase allows the communication interface to dynamically change over time. This can be used to adjust which data segments are prioritized, as well as the frequency and timeslot positions in which the prioritized data segments are transmitted. For example, in implementations in which DRAM refresh data is prioritized, the DRAM refresh requests may need to be sent more frequently when the temperature is high, and less frequently when the temperature is low. How frequent the DRAM refresh data is sent can be adjusted by changing the prioritization configuration on both the transmitter and the receiver. In some implementations, the interval of the reoccurring configuration transmission phase can also be a programmable value that is part of the communication interface configuration.

Figure 7:
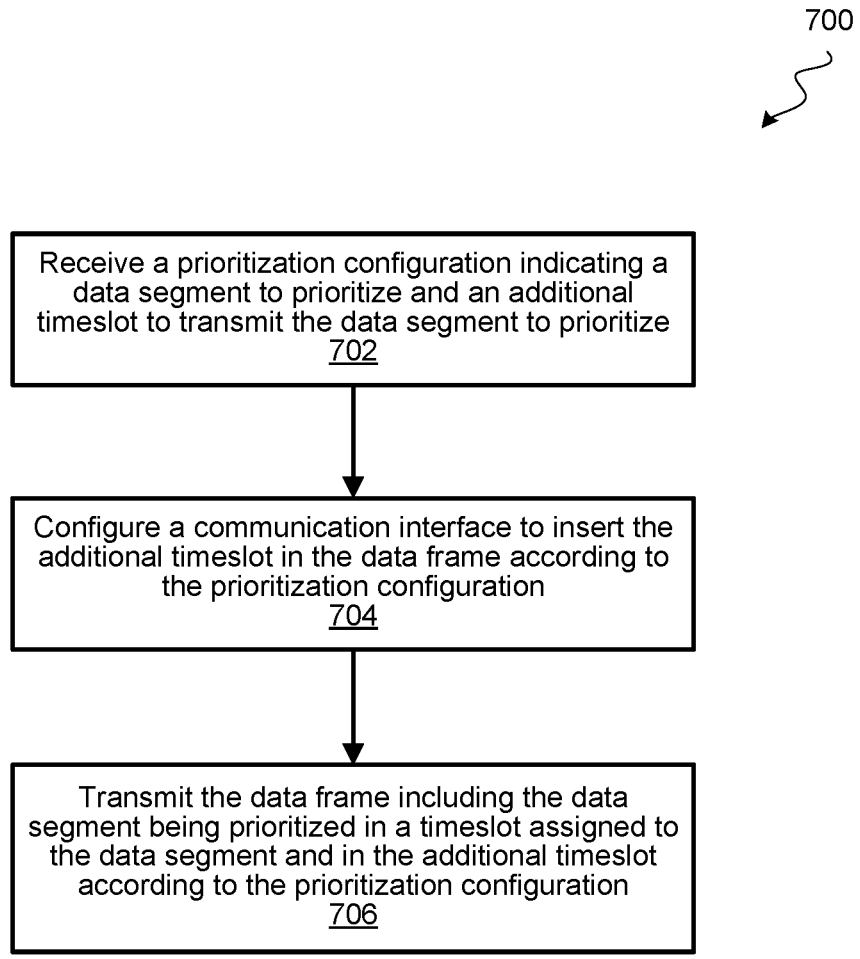
FIG. 7 illustrates a flow diagram of an example of a process for transferring data.

FIG. 7 illustrates a flow diagram of an example of a process 700 for transferring data in a data segments assigned to timeslots of a data frame. Process 700 can be performed, for example, by a transmitter of a communication system to transfer data to a receiver.

Process 700 may begin at block 702 by receiving a prioritization configuration indicating a data segment to prioritize and an additional timeslot to transmit the data segment to prioritize. For example, the prioritization configuration can be implemented using a prioritization configuration register, and the prioritization configuration is received by writing the prioritization configuration register. In some implementations, the prioritized configuration can also be transmitted to a receiver during a configuration transmission phase.

The prioritization configuration register may include a field for each timeslot of a base data frame (data frame with a default configuration). Hence, the number of fields may be equal to the number of data segments being serialized. To prioritize a data segment and transmit data for the prioritized data segment, a data segment identifier can be written into the field corresponding to the timeslot/position in the data frame to insert the additional timeslot. A null value in a field means no additional timeslot is to be inserted at the corresponding position in the data frame. Writing the same data segment identifier to multiple fields will result in multiple timeslots being inserted for the same prioritized data segment. Writing different data segment identifiers in different fields will result in multiple data segments being prioritized at the respective timeslot positions.

In some implementations, the prioritization configuration register can be implemented as a set of entries in which each entry includes a pair of data segment identifier and timeslot identifier. To prioritize a data segment, the data segment identifier of the data segment to prioritized is written into an entry, and a timeslot identifier corresponding to the position to insert the additional timeslot is also written into the same entry. To insert multiple timeslots, multiple entries are used. In other words, each entry of data segment/timeslot pair maps to one timeslot insertion. In some implementations, such a prioritization configuration register may also allow multiple additional timeslots to be inserted at the same timeslot position in the data frame. For example, two additional timeslots to transmit data for the same or different prioritized data segment can be inserted at the same timeslot position by writing the same timeslot identifier to two entries. In such a scenario, two adjacent additional timeslots can be inserted into the corresponding timeslot position.

In some implementations, the prioritization configuration register can be implemented as a linked list in which a data segment identifier corresponding to a prioritized data segment is linked to a list of one or more timeslot identifiers indicating the position in the data frame to insert additional timeslots for this prioritized data segment. In other words, the prioritization configuration register to prioritize a particular data segment may include the data segment identifier and a list of timeslot identifiers indicating the point in time at which the prioritization is needed. Additional linked lists can be used to prioritize additional data segments.

At block 704, a communication interface is configured to insert the additional timeslot in the data frame according to the prioritization configuration. For example, the communication interface can be configured to select data from the data channel corresponding to the prioritized data segment at the specified timeslot in the prioritization configuration. In some implementations, parameters for a data segment counter used by the communication interface can also be set based on the prioritization configuration such that the data segment counter increments for each timeslot except for the inserted timeslots, and rollovers at the data frame length.

At block 706, the data frame including the data segment being prioritized is transmitted in a timeslot assigned to the data segment and in the additional timeslot according to the prioritization configuration. For example, the communication interface may serialize the data segments according to a default sequence until a timeslot corresponding to a prioritization configuration is reached. The communication interface than transmits the originally assigned data segment for this time slot, followed by transmitting the prioritized segment, and then returning to the default sequence. The sequence of the data frame is repeated until a new prioritization configuration is received. A start-of-frame signal and a data segment strobe signal can also be transmitted together with the data frame.

At the receiver end, a similar process can be performed to re-parallelize the serialized data. For example, the receiver may receive the prioritization configuration from the transmitter, or otherwise be programmed with the same communication interface configuration (e.g., prioritization configuration, data frame length, etc.). The receiver may receive the data segments in the data frame according to the prioritization configuration, and recovery the data from the data frame based on the prioritization configuration indicating which timeslot position in the data frame has an additional timeslot to carry which prioritized data segment.

As described above, the communication interface is used to transfer data in a unilateral direction from a transmitter to a receiver. Some integrate circuit device can act as both a transmitted and a receiver. In such implementations, the communication interface may include a set of output signals (e.g., data segment strobe output, start-of-frame output, and serialized data bus output) for data transmission, and a set of input signals (e.g., data segment strobe input, start-of-frame input, and serialized data bus input) for data reception. Both the transmit and receive sides may use the same configurations. In such scenarios, a single set of configuration registers (but separate data segment counters) can be used. To allow independent configuration of the transmit and receive sides, two set of configuration registers can be implemented.

The techniques disclosed herein allows transmitting parallel data over a serial interface with little dependence between the timing constraints of the different signals that makes up the parallel data bus. The data transmission techniques also do not require extra synchronization information sent over the communication interface, which can be bandwidth limited. Dynamic allocation of available bandwidth to satisfy high refresh-rate requirements of particular signals can also be achieved without raising the interface frequency.

Figure 8:
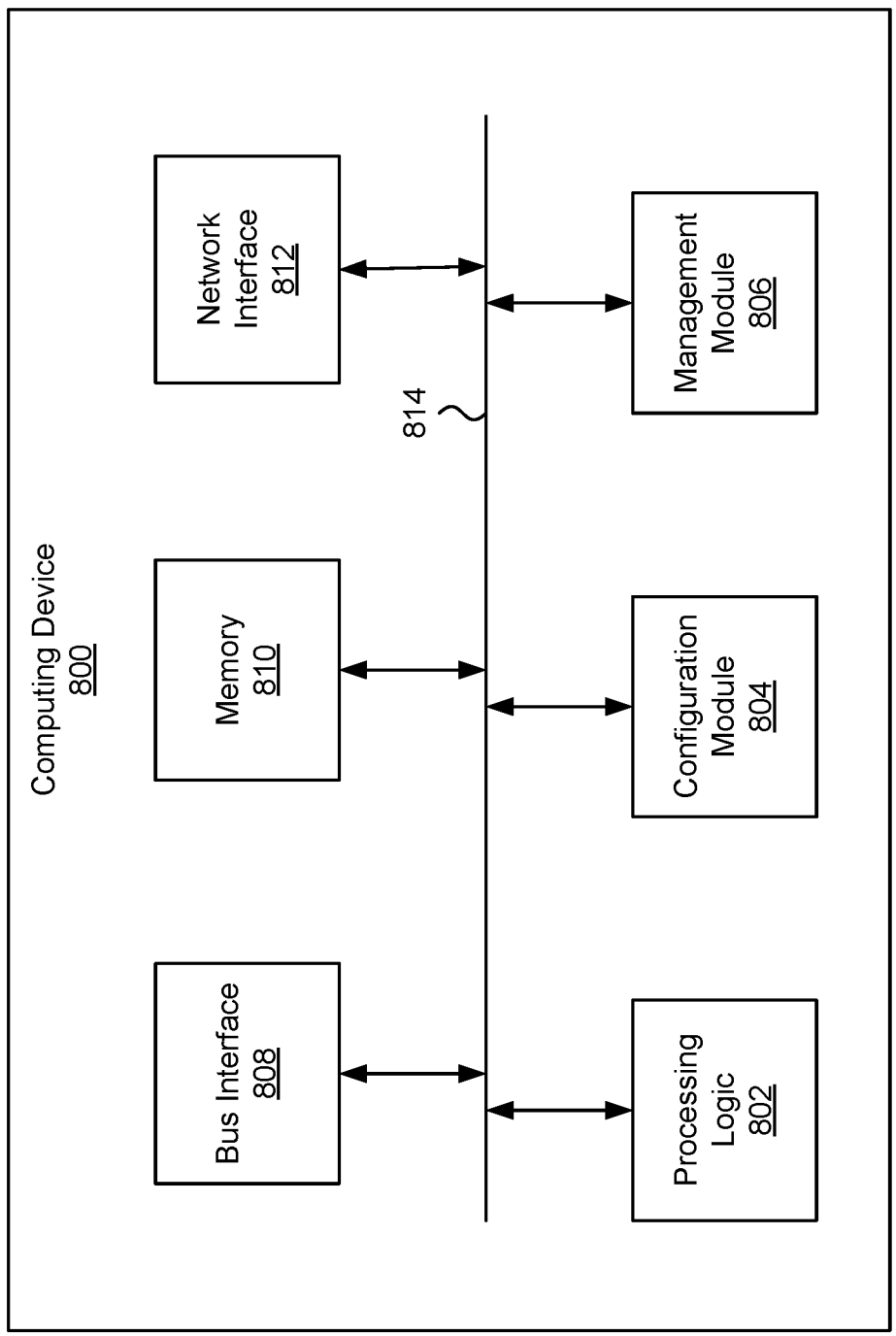
FIG. 8 illustrates a block diagram of an example of a computing device.

FIG. 8 illustrates an example of a computing device 800. In one example, the computing device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The computing device 800 may include additional modules, not illustrated here, such as components discussed with respect to the nodes disclosed in FIG. 9. In some implementations, the computing device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMID®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 800, while in other cases some or all of the memory may be external to the computing device 800. The memory 810 may store an operating system comprising executable instructions that, when executed by the processing logic 802, provides the execution environment for executing instructions providing networking functionality for the computing device 800. The memory may also store and maintain several data structures and routing tables for facilitating the functionality of the computing device 800.

In some implementations, the configuration module 804 may include one or more configuration registers. Configuration registers may control the operations of the computing device 800. In some implementations, one or more bits in the configuration register can represent certain capabilities of the computing device 800. Configuration registers may be programmed by instructions executing in the processing logic 802, and/or by an external entity, such as a host device, an operating system executing on a host device, and/or a remote device. The configuration module 804 may further include hardware and/or software that control the operations of the computing device 800.

In some implementations, the management module 806 may be configured to manage different components of the computing device 800. In some cases, the management module 806 may configure one or more bits in one or more configuration registers at power up, to enable or disable certain capabilities of the computing device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
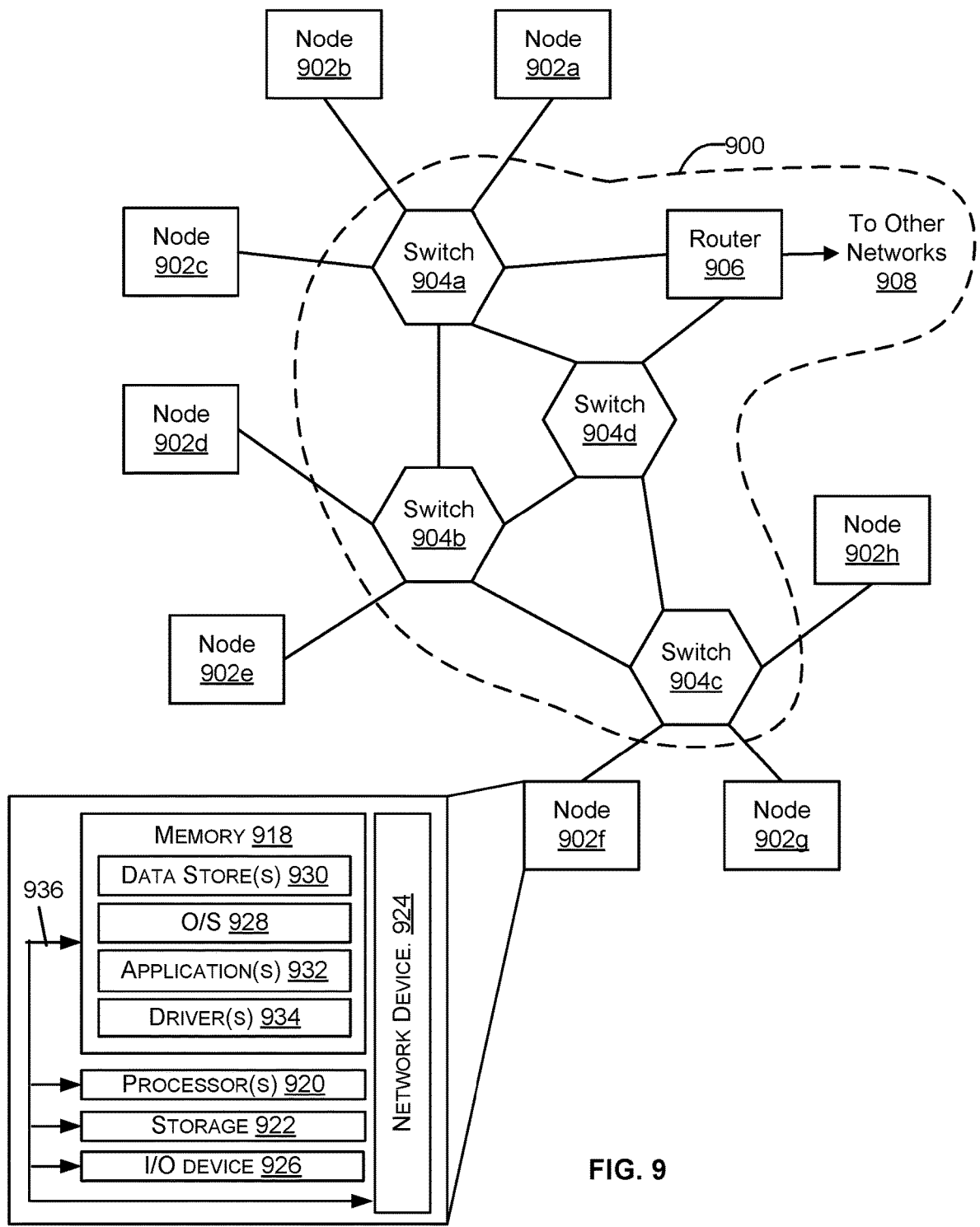
FIG. 9 illustrates a diagram of an example of a network.

FIG. 9 illustrates a network 900, illustrating various different types of network devices 800 of FIG. 8, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A computing device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third-party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900. The network device(s) 924 of FIG. 9 may include similar components discussed with reference to the computing device 800 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A communication system that transfers data in a plurality of data segments assigned to a plurality of timeslots of a data frame, the communication system comprising:
 a transmitter operable to:
  receive a prioritization configuration to prioritize a data segment, the prioritization configuration identifying the data segment to prioritize and an additional timeslot to transmit the data segment to prioritize;
  transmit the prioritization configuration to a receiver; and
  transmit the plurality of data segments in the data frame according to the prioritization configuration by transmitting the data segment being prioritized in the timeslot assigned to the data segment and the additional timeslot in the prioritization configuration; and
 a receiver operable to:
  receive the prioritization configuration from the transmitter;

receive the plurality of data segments in the data frame according to the prioritization configuration; and recover the data from the data frame based on the prioritization configuration.

2. The communication system of claim 1, wherein the transmitter is operable to transmit the data frame with a start-of-frame signal and a data segment strobe signal.

3. The communication system of claim 1, wherein a number of data segments in the data frame is configurable.

4. The communication system of claim 1, wherein the data segment to prioritize includes dynamic random-access memory (DRAM) refresh data or synchronization data.

5. An integrated circuit device comprising:
a communication interface operable to transfer data in a plurality of data segments assigned to a plurality of timeslots of a data frame; and
a prioritization configuration register configured to store a prioritization configuration providing a data segment identifier identifying a prioritized data segment and a timeslot identifier associated with the prioritized data segment, wherein the prioritization configuration configures the communication interface to insert, in the data frame, an additional timeslot corresponding to the timeslot identifier in the prioritization configuration to transmit the prioritized data segment.

6. The integrated circuit device of claim 5, wherein the communication interface includes a start-of-frame signal configured to transition at a start of each data frame.

7. The integrated circuit device of claim 6, wherein the start-of-frame signal is configured to remain asserted for a duration of each data frame.

8. The integrated circuit device of claim 5, wherein the communication interface includes a data segment strobe signal configured to transition at a start of each data segment.

9. The integrated circuit device of claim 5, further comprising:
a frame length configuration register configured to store a programmable frame length value representing a number of data segments in the data frame.

10. The integrated circuit device of claim 9, further comprising a data segment counter configured to count data segments in the data frame.

11. The integrated circuit device of claim 10, wherein the data segment counter is configured to rollover at the programmable frame length value.

12. The integrated circuit device of claim 11, wherein the data segment counter is configured to increment for each timeslot of the data frame except for the additional timeslot inserted for the prioritization configuration.

13. The integrated circuit device of claim 5, wherein the communication interface is configured to transmit the prioritization configuration to a receiver during a configuration transmission phase.

14. The integrated circuit device of claim 13, wherein the configuration transmission phase occurs periodically.

15. The integrated circuit device of claim 5, wherein the prioritization configuration further provides a second timeslot identifier associated with the prioritized data segment, and wherein the prioritization configuration configures the communication interface to insert, in the data frame, a second additional timeslot corresponding to the second timeslot identifier to transmit the prioritized data segment.

16. The integrated circuit device of claim 5, wherein the prioritization configuration further provides a second data segment identifier identifying a second prioritized data segment and a second timeslot identifier associated with the second prioritized data segment, and wherein the prioritization configuration configures the communication interface to insert, in the data frame, a second additional timeslot corresponding to the second timeslot identifier to transmit the second prioritized data segment.

17. The integrated circuit device of claim 5, further comprising:
a phase offset register configured to store a phase offset value representing a programmable delay between a start-of-frame signal and the data segments.

18. A method for transferring data in a plurality of data segments assigned to a plurality of timeslots of a data frame, the method comprising:
receiving a prioritization configuration indicating a data segment to prioritize and an additional timeslot to transmit the data segment to prioritize;
configuring a communication interface to insert the additional timeslot in the data frame according to the prioritization configuration; and
transmitting the data frame including the data segment being prioritized in a timeslot assigned to the data segment and in the additional timeslot according to the prioritization configuration.

19. The method of claim 18, further comprising:
transmitting the prioritization configuration to a receiver during a configuration transmission phase.

20. The method of claim 18, further comprising:
transmitting a start-of-frame signal and a data segment strobe signal with the data frame.

21. The method of claim 18, wherein the data frame has a programmable data frame length.

\* \* \* \* \*